May 4, 1954   R. H. SUESKIND   2,677,615
FROZEN POP CONFECTION
Filed May 4, 1953
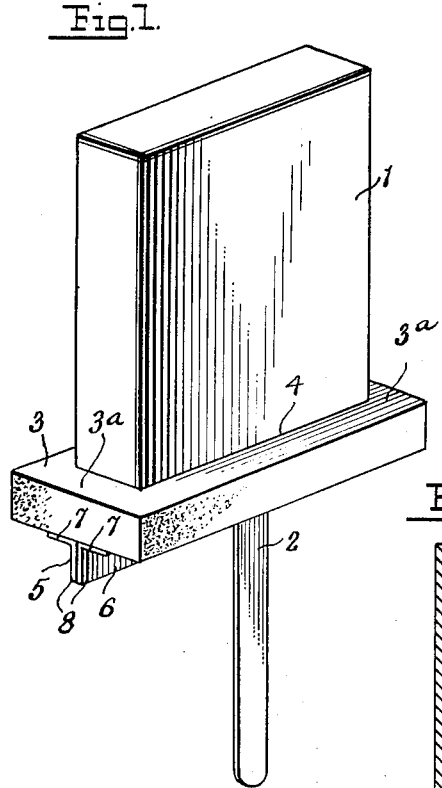
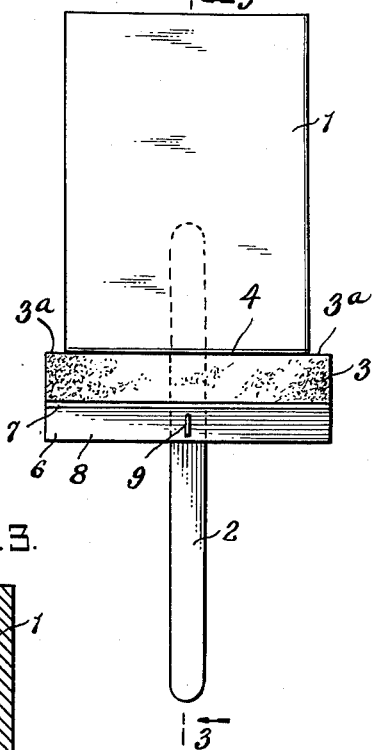
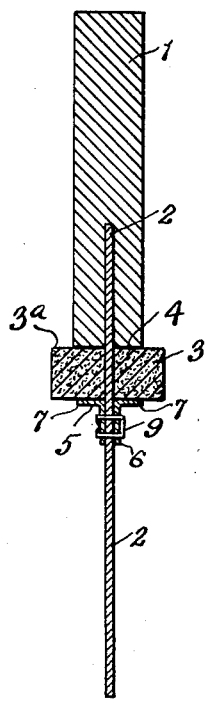
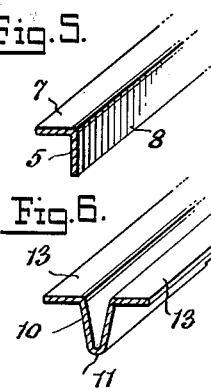
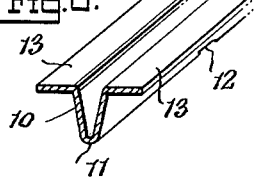
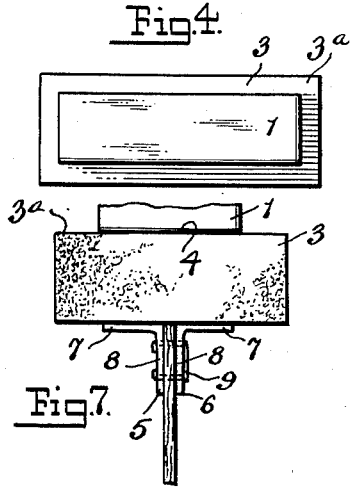
INVENTOR.
Ralph H. Sueskind
BY Harry Radzinsky
Attorney Patented May 4, 1954

2,677,615

UNITED STATES PATENT OFFICE 2,677,615

FROZEN POP CONFECTION

Ralph H. Sueskind, New York, N. Y.

Application May 4, 1953, Serial No. 352,805

6 Claims. (Cl. 99—137)

This invention relates to ice cream or other frozen pops of the order of ice or frozen sherbet, and has special reference to means for use in conjunction with such articles to afford protection from drippings created while the pops are being eaten, while at the same time providing an additional edible element for consumption along with the pop.

In my Patent No. 2,632,708, dated March 24, 1953, I disclose a protective cup for application to the lower end of a frozen pop to thereby provide an edible cup for catching drippings from the pop. The patent suggests that such a cup be made of the pastry or cracker material of the order of that from which ice cream cones are made. Such a material is of little or no absorbency; is brittle and thus easily destructible, and thus if the cups are applied at the factory there is the likelihood that the cups might be broken during shipment and handling of the cups. Thus, cups of the character mentioned in my said patent are probably more likely to be attached to the cups at the point of purchase of the pops. The material from which it is suggested that such cups might be made is such that the cup will collect the drippings in a satisfactory manner, but without any material absorption of the liquefied material of which the pops are composed.

It is therefore one of the objects of the present invention to provide a means for use in connection with frozen pops which will serve to catch any drippings from the pop while it is being eaten, but which will be made of such material that it will absorb the liquefied drippings and will result in a tasty confection which can be eaten along with the pop with considerable relish. Moreover, the material of which the drip-collector is made is such that it can be relatively soft, sponge-like and absorbent and not subject to easy cracking or chipping and hence the entire assembly, consisting of the pop and its drip collector, may be assembled at the plant and the pops and attached edible element shipped and handled without fear of the disintegration of the drip collector.

More particularly, the invention contemplates the provision of a block, or other suitably shaped section of a soft, absorbent cake which is impaled on the stick or handle of the pop so as to be positioned in close contact with the lower end of the pop. The cake is of such nature that it can be self-supporting on the stick, or suitable supporting means to be described, can be employed to hold it in close contact with the pop and in a position to catch the liquefied portions of the pop and absorb them and thus add flavoring material to the cake to render it more tasty and pleasant to eat.

The above objects, and other objects to be hereinafter set forth, are attained by the invention, a more particular description of which will appear and be set forth in the claims appended hereto.

In the accompanying drawing, wherein an illustrative embodiment of the invention is disclosed, Fig. 1 is a perspective view of a frozen pop to which the cake and a suitable support therefor is attached;

Fig. 2 is a front elevational view of the same;

Fig. 3 is a sectional view, taken substantially on the line 3—3 of Fig. 2, looking in the direction of the arrows;

Fig. 4 is a top plan view of the pop and the attached cake element;

Fig. 5 is a sectional view in perspective of one of the supports for the cake;

Fig. 6 is a sectional view in perspective of another embodiment of the cake support, and Fig. 7 is an end elevation of a portion of the pop, the cake and the supporting means therefor.

Referring to the drawing, the body of the pop is indicated at 1, and the same may be composed of ice cream, frozen sherbet, ice or other edible frozen materials made in any one of the many forms now on the market. The pop is provided with the conventional stick 2, generally composed of wood and sometimes made of other material, by means of which the pop is held in the hand while being eaten. The stick has one end embedded in the body of the pop, this end being frozen in the pop when the pop is made and thus maintained securely in the body of the pop.

Located at the bottom end 4 of the pop and impaled upon the stick or handle 2 of the pop is a section, block, or other suitably shaped piece 3 of a relatively soft and absorbent edible cake. The cake may be the so-called sponge cake, or that known as pound cake, or any other suitable kind, and particularly one which constitutes a suitable companion food for ice cream. In the form shown, the block of cake 3 is larger in size than the size of the end of the pop against which it is disposed so that a projecting marginal edge portion or ledge 3a is provided all around the pop. Such projecting edge portion or ledge 3a constitutes an exposed surface on which any liquefied portion or drippings from the pop will drain and be absorbed by the cake thus tending to flavor the cake and render it tasty and pleasant to eat.

As above stated, the cake may be soft and absorbent, yet can be, by the addition of a surface crust or other means, rendered sufficiently stiff to frictionally maintain its position on the stick or handle and be disposed with a flat upper face in close contact with the bottom end 4 of the pop. On the other hand, if the cake employed has a tendency to sag or crumble because of its softness, or because of subsequent saturation by the liquefied material of the pop, a means for supporting the cake can be provided, as disclosed in the drawing. In the form disclosed in Figs. 1, 2, 3 and 7, the supporting means consists of a pair of strips 5 and 6 of cardboard or other suitable material, one of these strips being shown in Fig. 5. Each of the strips is of angular cross-sectional shape and has a horizontal flange 7 disposed under and in contact with the flat lower face of the cake 3 to thereby support the cake between it and the under surface 4 of the pop. The strips 5 and 6 are placed on opposite sides of the stick or handle 2 so that the vertical flanges 8 on the strips are facially arranged against the opposite faces of the stick. A rivet or staple 9 extends through these flanges 8 and also passes through the stick 2 to thereby fasten the strips to the stick 2 and cause the cake to be sandwiched between these supports and the pop 1 and thus be firmly supported. The single fastening element or staple 9 enables the strips 5 and 6 to be easily pulled away from the handle as required during eating of the cake. It will be noted that the strips 5 and 6 are preferably as long as the length of the cake 3 and thus act to support the cake for its full length, although for firm and slightly stiff cakes the supporting strips might be made of less length than the length of the cake and might be shaped otherwise than shown.

In Figs. 1, 2, 3 and 7, the supporting elements for the cakes are shown in the form of two separate and independent strips 5 and 6. A modification of this is shown in Fig. 6 wherein it will be observed that a single longitudinally folded strip 10 is employed, the same being folded on the line 11 with an aperture 12 provided on said line through which the stick 2 may be inserted. The horizontal flanges 13 rest against the bottom of the cake 3 and support the same in the manner described in respect to the first embodiment, and the staple is employed for holding the strip in place, or it might be held in position solely by the frictional engagement of the stick 2 with the edges of the aperture 12.

While the pop is being eaten, any drippings or liquefied material of the pop will descend and come into contact with the projecting marginal portion or ledge 3a of the cake 3 and be absorbed thereby. Thus, the cake will not only serve as a drip catcher and prevent drippings from the pop from contacting with the clothes of the eater, but the liquefied pop ingredients will saturate and flavor the cake making it tasty and a pleasant companion-piece for the ice cream or other frozen material with which it is closely associated in the environment shown.

The cake, being composed of relatively soft material, will not crack or break while attached to the pop and thus it may be placed on the pop at the factory and enclosed in an envelope with the pop and handled and shipped without becoming damaged, detached or shattered. The cake associated with the ice cream can be eaten without being touched by the hands and a sanitary and palatable confection is the result.

While I have herein mentioned that the cake may have its marginal edges or a ledge protruding beyond the edge of the pop, this may not be found necessary with some types of cake of substantial absorbency; the supporting means for the cake may not be found necessary with some types of cake, and other changes may readily be made without departing from the spirit of the invention as defined by the claims appended hereto.

What I claim is:

1. An article for use with a preformed frozen pop of the order of ice cream, ice and frozen sherbet, and wherein a stick is embedded in the pop during the freezing formation thereof with the stick projecting a considerable distance at one end from the pop to constitute a handle, an edible block of absorbent cake material fitting on the stick and against one end of the pop and projecting beyond the sides of the pop with the entire body of the pop exposed for consumption and said block constituting an edible absorbent element for the drippings from the pop occurring during the eating of the same.

2. An article for use with a preformed frozen pop, as provided for in claim 1, and including a supporting element mounted on the stick beneath the block of cake and holding the cake confined on the stick between the bottom of the pop and the top of said supporting element.

3. An article for use with a preformed frozen pop, as provided for in claim 1, and including a supporting cardboard strip mounted on the stick and secured thereto beneath the block of cake and holding the cake confined on the stick between the bottom of the pop and the top of the supporting strip.

4. An article for use with a preformed frozen pop of the order of ice cream, ice and frozen sherbet, and wherein a stick is embedded in the pop during the freezing formation thereof with the stick projecting a considerable distance at one end from the pop to constitute a handle, an edible block of soft, absorbent cake entirely below the pop and through which the handle extends, and supporting means on the handle for holding the cake supported against the bottom of the pop.

5. An article as in claim 4, wherein the supporting means consists of a strip attached to the handle below the cake, said strip being as long as the cake to thereby support the cake for its full length.

6. An article as in claim 4, wherein the supporting means consists of at least one cardboard strip attached to the handle below the cake, said strip being at least as long as the cake and being secured to the handle below the cake by a fastening element penetrating the strip and the handle.

References Cited in the file of this patent

UNITED STATES PATENTS

| Number | Name | Date |
| --- | --- | --- |
| 1,761,703 | Brimer | June 3, 1930 |
| 1,786,387 | Battista | Dec. 23, 1930 |
| 1,802,306 | Baker | Apr. 21, 1931 |
| 1,938,113 | Schoenfeld | Dec. 5, 1933 |
| 2,162,224 | Legge | June 13, 1939 |
| 2,632,708 | Sueskind | Mar. 24, 1953 |